US005494431A

United States Patent [19]
Telfer

[11] Patent Number: 5,494,431
[45] Date of Patent: Feb. 27, 1996

[54] DEVICE FOR EMBLEMIZING INDICIA ONTO THE SOLES OF SHOES FOR IDENTIFICATION AND INDIVIDUALLY PURPOSES

[76] Inventor: Mark A. Telfer, 3101 Nelson St., Bakersfield, Calif. 93306

[21] Appl. No.: 250,910
[22] Filed: May 31, 1994
[51] Int. Cl.⁶ .......................... B29C 59/00; B29C 43/02; B41B 11/62
[52] U.S. Cl. .......................... 425/385; 425/193; 425/409; 264/293; 249/103
[58] Field of Search ........................... 249/103, 104, 249/140; 264/132, 293, 244; 425/95, 106, 119, 385, 193, 409

[56] References Cited

U.S. PATENT DOCUMENTS

| 1,901,546 | 3/1933 | Barge | 425/119 |
| 2,176,371 | 10/1939 | Wahl | 101/269 |
| 3,584,572 | 6/1971 | Apicella | 101/27 |
| 3,667,883 | 6/1972 | Ludwig et al. | 425/119 |
| 3,990,360 | 11/1976 | Nethercot | 101/27 |
| 4,004,503 | 1/1977 | Dwyer | 101/27 |
| 4,542,690 | 9/1985 | Kikuchi | 101/27 |
| 4,557,792 | 12/1985 | Yamada et al. | 156/583.91 |

FOREIGN PATENT DOCUMENTS

| 1197628 | 12/1959 | France | 425/119 |
| 496100 | 6/1954 | Italy | 425/119 |
| 349021 | 5/1931 | United Kingdom | 425/119 |
| 360912 | 11/1931 | United Kingdom | 425/119 |

Primary Examiner—James P. Mackey
Assistant Examiner—Vi Duong Dang

[57] ABSTRACT

A device for emblemizing indicia onto the soles of shoes for identification and individuality purposes including a base in a rectangular configuration having an upper surface, a lower surface, parallel side edges and parallel front and rear edges, the base having a rectangular recess in its upper surface adjacent to the front edge, the base also having a plurality of recesses in its upper surface adjacent to its rear edge; a pivot structure formed of parallel bars pivotally mounted at their lower ends to the side edges of the base adjacent to the rear edge with a support post coupled between the upper ends of the bars; a shoe supporting structure comprising a shoe tree coupled to the support post; and a heating platen of a rectangular configuration positionable within the recess at the front edge of the base, the platen having a recess on its upper surface for the receipt of pre-selected marking components with indicia on the upper surface of the marking components; and a heating device located within the platen with an associated control on the upper surface of the base thereadjacent whereby when heat is provided to the platen and supported marking components and a shoe is supported on the shoe tree and pivoted downwardly through the rotation of the bars to place the shoe sole in contact with the indicia, the soles will be emblazoned with the indicia on the marking components.

1 Claim, 4 Drawing Sheets

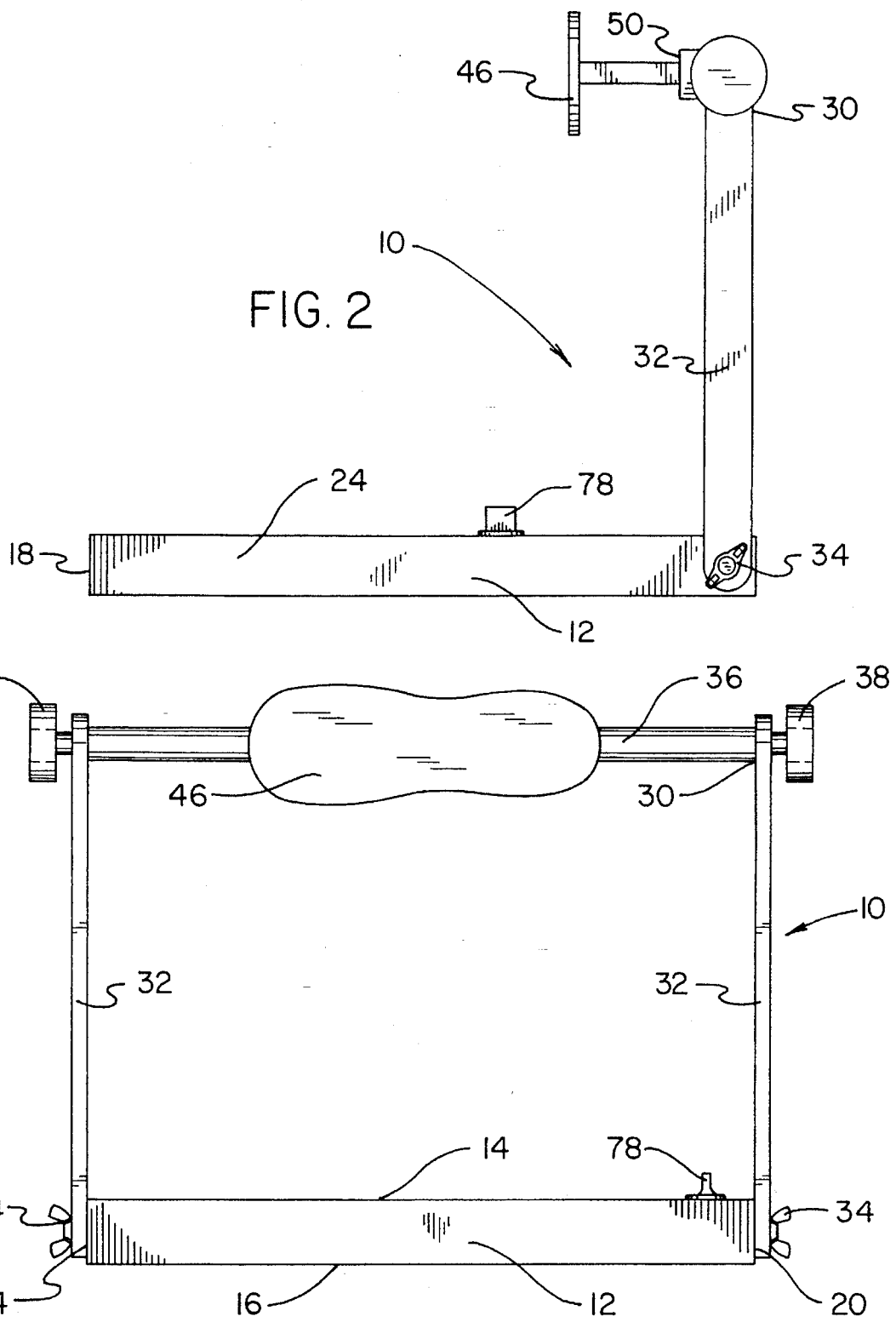

DEVICE FOR EMBLEMIZING INDICIA ONTO THE SOLES OF SHOES FOR IDENTIFICATION AND INDIVIDUALLY PURPOSES

BACKGROUND OF THE INVENTION

1. Field of the Invention

The present invention relates to device for emblemizing indicia onto the soles of shoes for identification and individuality purposes and more particularly pertains to providing shoes and sneakers with markings on the sole so as the shoes will be individualized for identification or expression purposes.

2. Description of the Prior Art

The use of shoes and sneakers with various forms of markings and indicia is known in the prior art. More specifically, shoes and sneakers with various forms of markings and indicia heretofore devised and utilized for the purpose of marking shoes with words and symbols for a wide variety of purposes are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 3,584,572 to Apicella discloses a method, apparatus and die adapted to simultaneously heat stamp, emboss and cut.

U.S. Pat. No. 3,990,360 to Nethercot discloses a hot press printing machine.

U.S. Pat. No. 4,004,503 to Dwyer discloses a device for imprinting indicia on a flexible article.

U.S. Pat. No. 4,542,690 to Kikuchi discloses a heat-sensitive printing machine.

U.S. Pat. No. 4,557,792 to Yamada discloses a hot press.

In this respect, the device for emblemizing indicia onto the soles of shoes for identification and individuality purposes according to the present invention substantially departs from the conventional concepts and designs of the prior art, and in so doing provides an apparatus primarily developed for the purpose of providing shoes and sneakers with markings on the sole so as the shoes will be individualized for identification or expression purposes.

Therefore, it can be appreciated that there exists a continuing need for new and improved device for emblemizing indicia onto the soles of shoes for identification and individuality purposes which can be used for providing shoes and sneakers with markings on the sole so as the shoes will be individualized for identification or expression purposes. In this regard, the present invention substantially fulfills this need.

SUMMARY OF THE INVENTION

In view of the foregoing disadvantages inherent in the known types of shoes and sneakers with various forms of markings and indicia now present in the prior art, the present invention provides an improved device for emblemizing indicia onto the soles of shoes for identification and individuality purposes. As such, the general purpose of the present invention, which will be described subsequently in greater detail, is to provide a new and improved device for emblemizing indicia onto the soles of shoes for identification and individuality purposes apparatus and method which has all the advantages of the prior art and none of the disadvantages.

To attain this, the present invention essentially comprises a new and improved device for emblemizing indicia onto the soles of shoes for identification and individuality purposes comprising, in combination: a base in a rectangular configuration having an upper surface, a lower surface, parallel side edges and parallel front and rear edges, the base having a rectangular recess in its upper surface adjacent to the front edge, the base also having a plurality of recesses in its upper surface adjacent to its rear edge; a pivot structure formed of parallel bars pivotally mounted at their lower ends to the side edges of the base adjacent to the rear edge with a support post coupled between the upper ends of the bars; a shoe supporting structure comprising a shoe tree and a receptacle with a post therebetween, the receptacle having a pair of recesses formed therein, and a pair of rods extending outwardly from the central section of the post in a radial orientation for being received in the recesses of the receptacle and bolts rotatably through threaded apertures in the receptacle for securing the rods and receptacle together during operation and use; a heating platen of a rectangular configuration positionable within the recess at the front edge of the base, the platen having a recess on its upper surface for the receipt of pre-selected marking components with indicia on the upper surface of the marking components; and a heating device located within the platen with an associated control on the upper surface of the base thereadjacent whereby when heat is provided to the platen and supported marking components and a shoe is supported on the shoe tree and pivoted downwardly through the rotation of the bars to place the shoe sole in contact with the indicia, the soles will be emblazoned with the indicia on the marking components.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for emblemizing indicia onto the soles of shoes for identification and individuality purposes which has all the advantages of the prior art shoes and sneakers with various forms of markings and indicia and none of the disadvantages.

It is another object of the present invention to provide a new and improved device for emblemizing indicia onto the soles of shoes for identification and individuality purposes which may be easily and efficiently manufactured and marketed.

It is a further object of the present invention to provide a new and improved device for emblemizing indicia onto the soles of shoes for identification and individuality purposes which is of a durable and reliable construction.

An even further object of the present invention is to provide a new and improved device for emblemizing indicia onto the soles of shoes for identification and individuality purposes which is susceptible of a low cost of manufacture with regard to both materials and labor, and which accordingly is then susceptible of low prices of sale to the consuming public, thereby making such shoes and sneakers with various forms of markings and indicia economically available to the buying public.

Still yet another object of the present invention is to provide a new and improved device for emblemizing indicia onto the soles of shoes for identification and individuality purposes which provides in the apparatuses and methods of the prior art some of the advantages thereof, while simultaneously overcoming some of the disadvantages normally associated therewith.

Still another object of the present invention is to providing shoes and sneakers with markings on the sole so as the shoes will be individualized for identification or expression purposes Lastly, it is an object of the present invention to provide new and improved device for emblemizing indicia onto the soles of shoes for identification and individuality purposes comprising: a base in a rectangular configuration having an upper surface, a lower surface, parallel side edges and parallel front and rear edges, the base having a rectangular recess in its upper surface adjacent to the front edge, the base also having a plurality of recesses in its upper surface adjacent to its rear edge; a pivot structure formed of parallel bars pivotally mounted at their lower ends to the side edges of the base adjacent to the rear edge with a support post coupled between the upper ends of the bars; a shoe supporting structure comprising a shoe tree coupled to the support post; and a heating platen of a rectangular configuration positionable within the recess at the front edge of the base, the platen having a recess on its upper surface for the receipt of pre-selected marking components with indicia on the upper surface of the marking components; and a heating device located within the platen with an associated control on the upper surface of the base. thereadjacent whereby when heat is provided to the platen and supported marking components and a shoe is supported on the shoe tree and pivoted downwardly through the rotation of the bars to place the shoe sole in contact with the indicia, the soles will be emblazoned with the indicia on the marking components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the device illustrated in FIG. 1.

FIG. 3 is a front elevational view of the device illustrated in FIGS. 1 and 2.

FIG. 4 is an enlarged perspective view of the central portion of the suppert shaft taken about the oval portion of FIG. 4.

The same reference numbers refer to the same parts throughout the various figures.

DESCRIPTION OF THE PREFERRED EMBODIMENT

Figure 1:
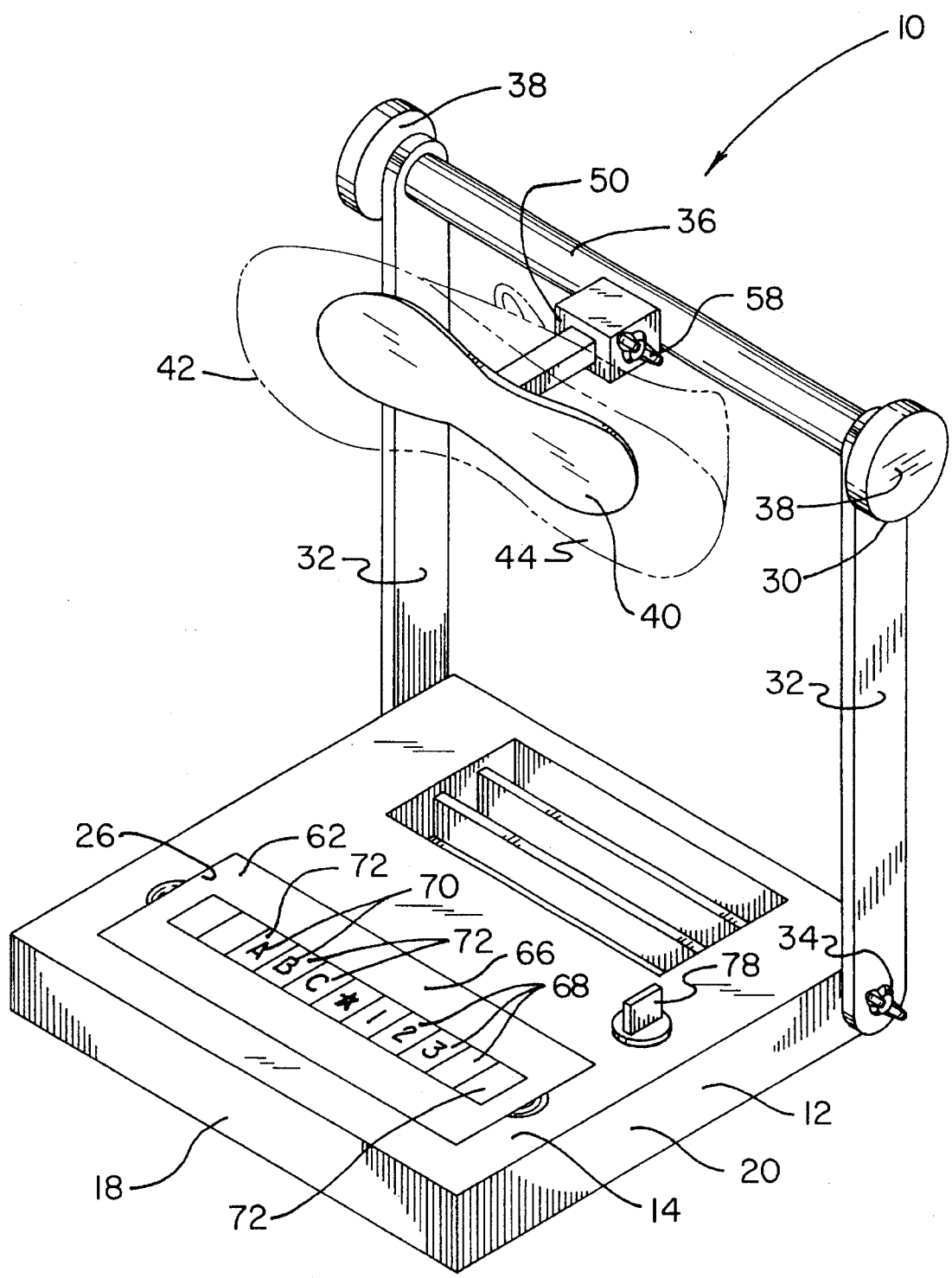
FIG. 1 is a perspective view of the preferred embodiment of the new and improved device for emblazoning indicia onto the soles of shoes for identification and individuality purposes constructed in accordance with the principles of the present invention.
Figure 4:
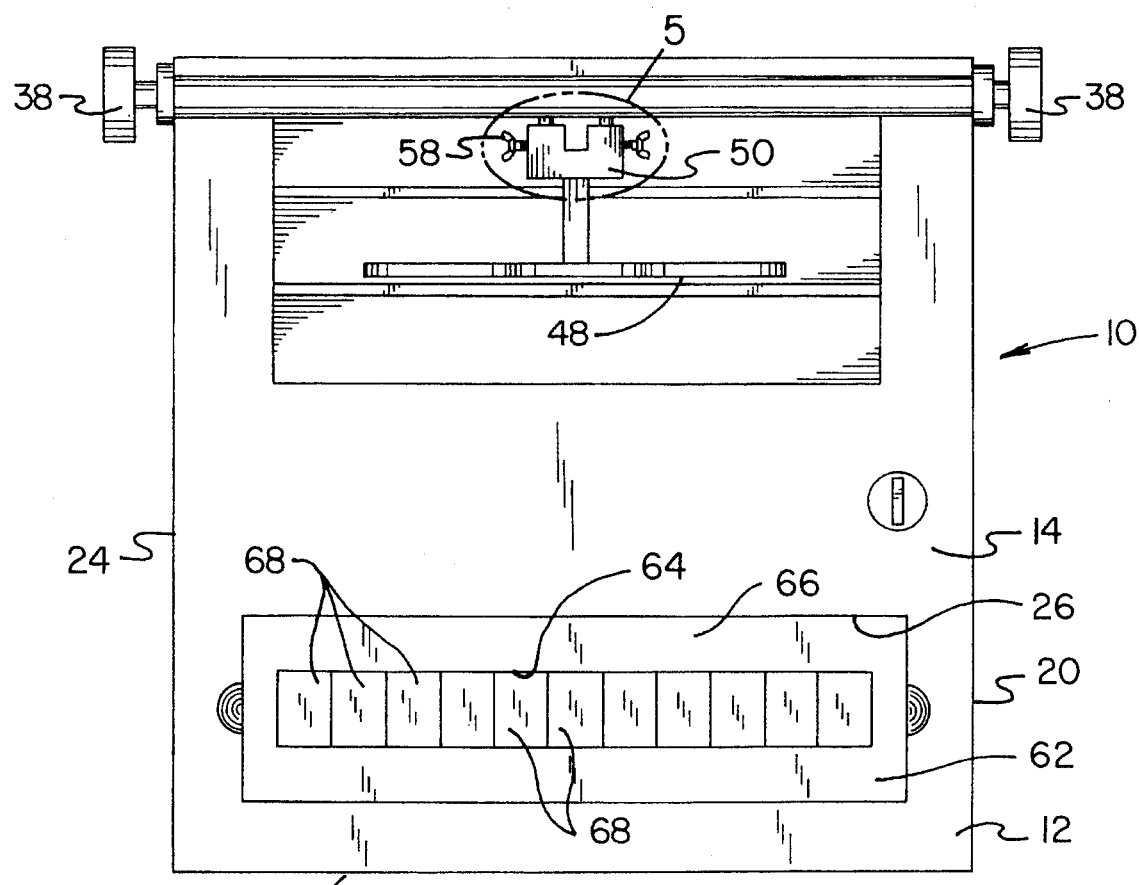
FIG. 4 is a top elevational view of the device shown in the prior figure.
Figure 5:
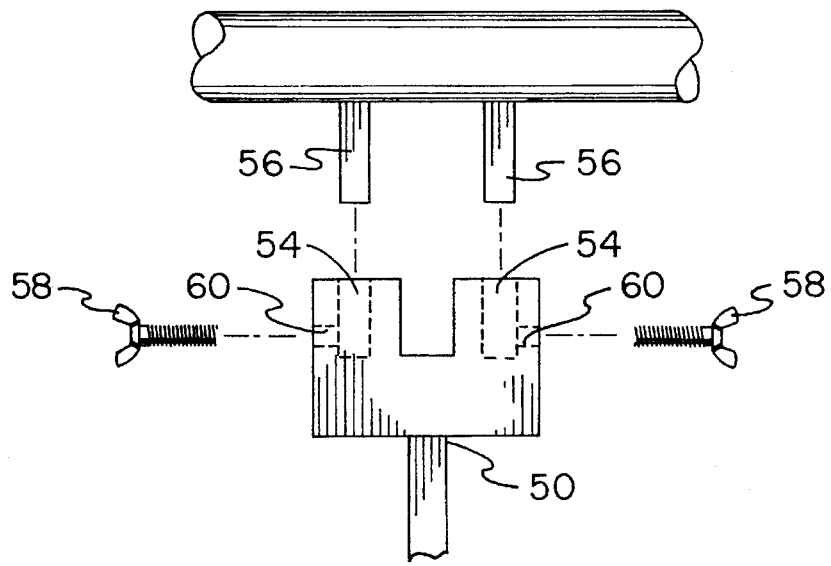
FIG. 5 is a front elevational view of the coupling mechanism illustrated in the circle portion of FIG. 4.
Figure 6:
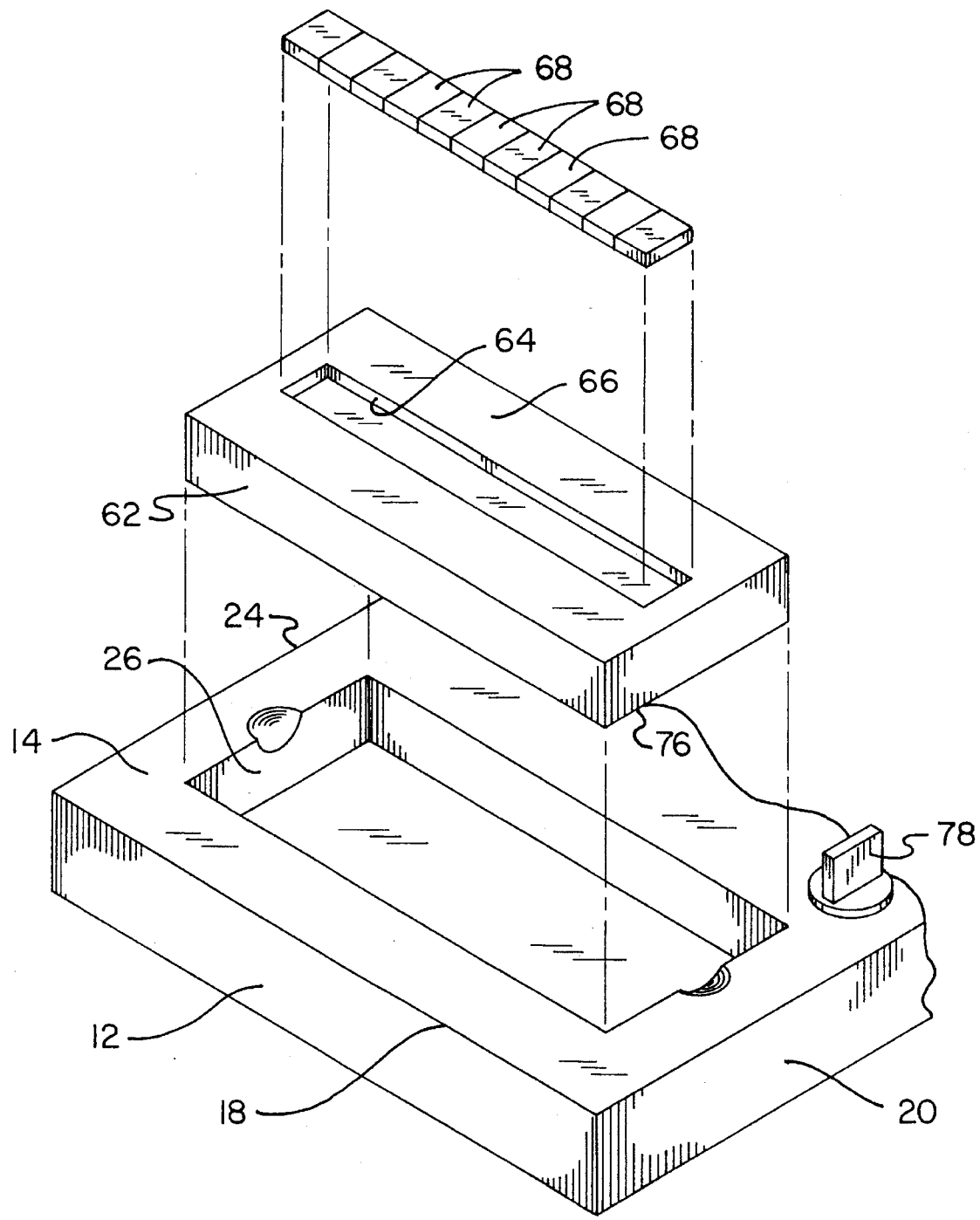
FIG. 6 is an exploded perspective view of the die portion of the device illustrated in FIGS. 1 through 4.

With reference now to the drawings, and in particular to FIG. 1 thereof, a new and improved device for emblemizing indicia onto the soles of shoes for identification and individuality purposes embodying the principles and concepts of the present invention and generally designated by the reference numeral 10 will be described.

The present invention, the new and improved device for emblemizing indicia onto the soles of shoes for identification and individuality purposes, as comprised of a plurality of components. In their broadest context, such components include a base, a pivot structure, a shoe support, a heating platen and a heating device. Such components are individually configured and correlated with respect to each other so as to attain the desired objectives.

More specifically, the device is a system 10 which is built upon a base 12. The base is in a rectangular configuration having an upper surface 14 a lower surface 16. The base also has parallel side edges 18 and parallel front and rear edges 20 and 24. The base has a rectangular recess 26 in its upper surface adjacent to the front edge. The base also has a plurality of recesses in its upper surface adjacent to its rear edge. The recesses adjacent the rear edge are formed merely receiving and holding a supply of marking components as will be described herein after.

Secured with respect to the base is a pivot structure 30. The pivot structure is formed of a pair of parallel bars 32. Such bars are pivotally secured by pins 34 mounted at their lower ends to the side edges of the base adjacent to the rear edge. A supporting post 36 is coupled between the upper ends of the bars. Handles 38 are located at the ends of the post.

The shoe 42 to be marked on its sole 44 is supported on a support structure 46. The support structure includes a shoe tree 48. It also includes a receptacle 50. A post couples the shoe tree and the receptacle.

The receptacle has a pair of recesses 54 formed therein. A pair of rods 56 extend outwardly from the central section of the post in a radio orientation. The rods are for being received in the recesses of the receptacle. Bolts 58 are rotatable through threaded apertures 60 in the receptacle for securing the rods and receptacle together during operation and use.

Removably secured within the recess at the front edge of the base member in a heating platen 62. The platen is of a rectangular configuration. It is positionable within the recess at the front edge of the base. The platen has a rectangular recess 64 formed into its upper surface 66. Such recess is for the receipt of preselected marking components 68. Such marking components are formed of indicia on the upper surface of the marking component. The indicia 70 are formed of thermally conductive material such as metal to effect a marking of the sole of a shoe brought in contact therewith. The remainder 72 of the components are of a thermally insulating material.

Located within the platen is a heating device 76 such heating device is of a conventional construction. It includes an associated control on the upper surface of the base adjacent to the platen. In this manner, when the heating device is energized and heat is provided to the platen as well as the indicia of the marking components, and when the sole of a shoe support of a shoe tree is pivoted downwardly through the rotation of the bars, the sole a shoe is brought in contact with the indicia. The sole will thus be emblazened by the heat of the indicia with the indicia on the preselected marking components.

The present invention is an appropriate name for a mechanism designed to emboss names, initials, etc. on the sole of a shoe. It is a play on the word nicknames, and, of course, the word kick is associated with the novel location of this personalized identification. The mechanism is comprised of a press bar, two shoe trees, a base, a series of dies and associated hardware.

The shoe trees are offered in all sizes, from one to thirteen. These are mounted on the press bar using a top mounted extension with two pilot holes and wing nuts. The pilot holes engage two correspondingly spaced projections on the press bar. Two bar-like, right angled arms are rotationally mounted at either end of the base. They are joined to the press bar just inside the handles at the ends of the press bar.

The base incorporates heating elements and also serves as a hot plate upon which a sliding size plate is mounted. This size plate serves as the receptacle for the dies which take the form of all of the letters of the alphabet and all the numbered sizes. The size plate can be moved to any position across the face of the base to compensate for the size of the shoe being embossed.

In use, the shoe is first mounted upon the shoe tree. Then with the base sufficiently heated, one need only rotate the press bar to press the sole of the shoe against the pre-selected dies placed in the size plate. The result is a personalized inscription permanently emblazoned across the sole of the shoe. The present invention is not only a novel expression of individuality, but a practical means of identification as well.

The mix-up of shoes in gatherings, such as those at gyms and in pre-school groups, can be a problem of the past.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for emblemizing indicia onto the soles of shoes for the purpose of identification and individuality comprising, in combination:

a base in a rectangular configuration having an upper surface, a lower surface, parallel side edges and parallel front and rear edges, the base having a rectangular recess in its upper surface adjacent to the front edge, the base also having a plurality of recesses in its upper surface adjacent to its rear edge;

a pivot structure formed of a pair of spaced parallel bars pivotally mounted at their lower ends to the side edges of the base adjacent to the rear edge with a support post coupled between the upper ends of the bars, the pivot structure adapted to move between a raised loading orientation and a lowered operative orientation;

a shoe supporting structure comprising a shoe tree in a shoe-shaped configuration for the receipt of a shoe with a sole and a receptacle with a post therebetween, the receptacle having a pair of recesses formed therein, and a pair of rods extending outwardly from the central section of the post in a radial orientation for being received in the recesses of the receptacle and bolts rotatably through threaded apertures in the receptacle for securing the rods and receptacle together during operation and use;

a heating platen of a rectangular configuration positionable within the recess at the front edge of the base, the platen having a recess on its upper surface;

a plurality of individual pre-selected marking components with indicia on the upper surface of the marking components positioned within the recess of the upper surface of the platen for being contacted by the sole of a shoe when the pivot structure is in the lower operative position; and a heating device located within the platen with an associated control on the upper surface of the base thereadjacent whereby when heat is provided to the platen and supported marking components and a shoe is supported on the shoe tree and pivoted downwardly through the rotation of the bars to place the shoe sole in contact with the indicia, the soles will be emblazoned with the indicia on the marking components.

* * * * *